United States Patent
Westberg et al.

(10) Patent No.: US 9,160,714 B2
(45) Date of Patent: Oct. 13, 2015

(54) USING TUNNELING TO ENHANCE REMOTE LAN CONNECTIVITY

(75) Inventors: Lars Westberg, Enkoping (SE); Laszlo Hevizi, Piliscsaba (HU); Vicknesan Ayadurai, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 2618 days.

(21) Appl. No.: 10/610,376

(22) Filed: Jun. 30, 2003

(65) Prior Publication Data

US 2004/0267874 A1  Dec. 30, 2004

(51) Int. Cl.
 *H04L 29/06* (2006.01)
 *H04L 29/12* (2006.01)
 *H04W 4/18* (2009.01)
 *H04W 8/26* (2009.01)
 *H04W 76/02* (2009.01)

(52) U.S. Cl.
 CPC ....... *H04L 63/0272* (2013.01); *H04L 29/12009* (2013.01); *H04L 61/00* (2013.01); *H04W 4/18* (2013.01); *H04W 8/26* (2013.01); *H04W 76/022* (2013.01)

(58) Field of Classification Search
 USPC .......................... 709/227, 230, 238, 245, 249
 See application file for complete search history.

(56) References Cited

U.S. PATENT DOCUMENTS

| | | | | |
|---|---|---|---|---|
| 5,835,710 A | * | 11/1998 | Nagami et al. | 709/250 |
| 6,614,781 B1 | * | 9/2003 | Elliott et al. | 370/352 |
| 6,697,377 B1 | * | 2/2004 | Ju et al. | 370/466 |
| 6,701,375 B1 | * | 3/2004 | Walker et al. | 709/243 |
| 7,028,335 B1 | * | 4/2006 | Borella et al. | 726/11 |
| 7,039,720 B2 | * | 5/2006 | Alfieri et al. | 709/242 |
| 7,120,701 B2 | * | 10/2006 | Warrier et al. | 709/245 |
| 2003/0012149 A1 | | 1/2003 | Maggenti et al. | |
| 2003/0039237 A1 | * | 2/2003 | Forslow | 370/352 |
| 2003/0106067 A1 | * | 6/2003 | Hoskins et al. | 725/119 |
| 2003/0179761 A1 | * | 9/2003 | Dobbins et al. | 370/401 |
| 2004/0088542 A1 | * | 5/2004 | Daude et al. | 713/156 |
| 2004/0246990 A1 | * | 12/2004 | Krishnamurthi et al. | 370/466 |
| 2004/0252717 A1 | * | 12/2004 | Solomon et al. | 370/466 |

FOREIGN PATENT DOCUMENTS

| | | |
|---|---|---|
| JP | 2003-163747 A | 6/2003 |
| WO | 03/003652 | 1/2003 |

OTHER PUBLICATIONS

U. Gustafson, et al.; "Network Design With Mobile IP", Conference Inet 2001, 'Online!, Jun. 8, 2001, pp. 1-20, XP002277892, Stockholm, Sweden.
C. Xenakis, et al.,; "Secure VPN Deployment in GPRS Mobile Networks", Conference European Wireless 2002—Next Generation Wireless Networks, 'Online!, Feb. 28, 2002, pp. 1-8, XP002277893.

(Continued)

Primary Examiner — Mohamed Ibrahim

(57) ABSTRACT

The address translation capabilities of packet-switched mobile networks are exploited to achieve bidirectional LAN communications therethrough. A multi-dash user VPN can be provided by encapsulating a multi-user LAN communication protocol for traversal of a packet-switched network. By encapsulating a commonly available multi-user LAN communication protocol, for example ethernet, remote LAN connectivity can be extended without requiring any host reconfiguration.

21 Claims, 2 Drawing Sheets

(56) References Cited

OTHER PUBLICATIONS

H. Levkowetz, et al.; "RFC 3519 Mobile IP Traversal of Network Address Translation Devices"; *RFC 3519 Mobile IP Traversal of Network Address Translation Devices*, 'Online!, Apr. 2003, pp. 1-33, XP002277894.

*EtherIP: Tunneling Ethernet Frames in IP Datagrams*, Housley & Hollenbeck, The Internet Society, Network Working Group, RFC 3378, Sep. 2002, pp. 1-9.

*Layer Two Tunneling Protocol "L2TP"*, Townsley, et al., The Internet Society, Network Working Group, RFC 2661, Aug. 1999, pp. 1-75.

*Generic Routing Encapsulation (GRE)*, Farinacci, et al., The Internet Society, Network Working Group, RFC 2784, Mar. 2000, pp. 1-9.

*Traditional IP Network Address Translator (Traditional NAT)*, Srisuresh & Egevang, The Internet Society, Network Working Group RFC 3022, Jan. 2001, pp. 1-15.

* cited by examiner

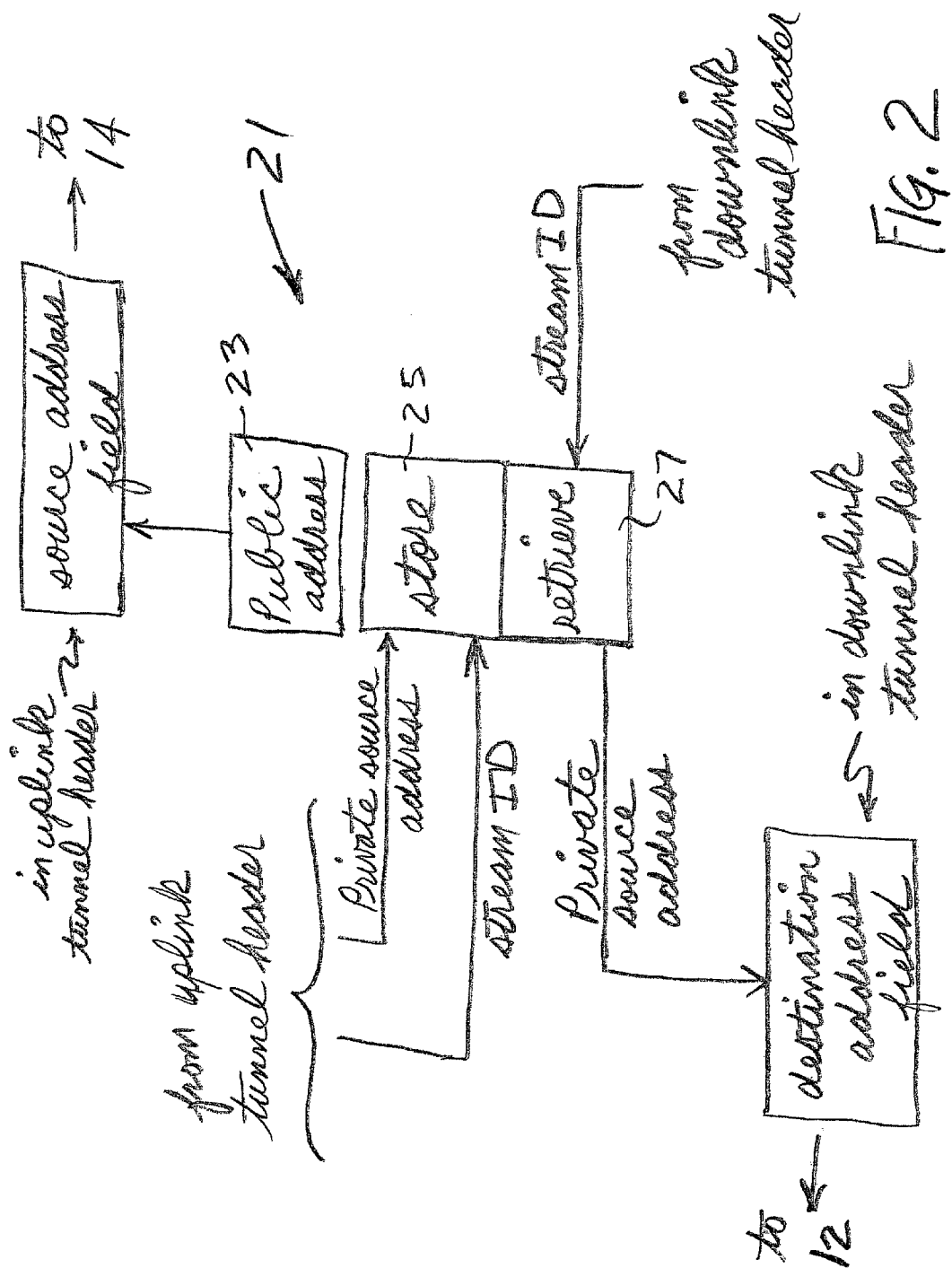

USING TUNNELING TO ENHANCE REMOTE LAN CONNECTIVITY

FIELD OF INVENTION

The invention relates generally to local area networks and, more particularly, to remotely connected local area networks.

BACKGROUND OF THE INVENTION

The following documents are incorporated herein by reference: (1) RFC3378: EtherIP: Tunnelling Ethernet Frames in IP Datagrams; (2) RFC2661: Layer Two Tunnelling Protocol "L2TP"; (3) RFC2784: Generic Routing Encapsulation (GRE); and (4) RFC3022: Traditional IP Network Address Translator.

Virtual Private Networks (VPNs) allow an on-the-go user to access hosts on the user's home network, such as a fixed local area network (LAN), from remote locations. VPNs typically utilize existing public network infrastructures, for example the Internet, to achieve this remote access. To create a typical VPN, a secure connection is established between an entity at the remote-end, for example software on the user's PC, and a corresponding entity (for example a security gateway) at the network. Data is transported between the remote host and the home network using the publicly available network infrastructure.

Many conventional approaches to achieving connectivity between the remote end and the home end of a VPN utilize "virtual" point-to-point connectivity over a packet-switched network within the public network infrastructure. One conventional approach to achieving this connectivity is to create an IPSec "tunnel" over the public network between the remote-end host and the home-end host. For example, IPSec tunnels frequently traverse a private corporate intranet, and then the public Internet, thereby enabling corporate users to utilize the public Internet to access their corporate intranet. However, this IPSec tunnel solution is relatively complicated to implement, because the remote-end host must be specially configured and provided with specialized software, and because firewall and security gateways are needed at the home network.

Another known approach to achieving VPN connectivity is the SSL-based VPN. This approach is simple to use, because it is web browser-based. However, this means that only web-based applications may be run from the remote-end host. This may be undesirable for various reasons, especially when it is desired to establish VPN connectivity to a remote-end host running a legacy application that is not web-based.

In order to make connectivity to LANs more flexible, wireless LANs (WLANs) are increasingly common. (Hereinafter, the acronym "LAN" can generically refer either to a wired LAN or a wireless LAN.). In WLANs, PCs or other hosts within a WLAN coverage area, or "hotspot", are able to connect to the LAN via an RF connection. However, the aforementioned WLAN hotspots are limited in coverage. For example, a typical WLAN hotspot has only a relatively short radio coverage range, typically on the order of 100 meters. Furthermore, each WLAN hotspot needs to be installed and supported, both technically and financially, by an operator or provider of some kind. Users subscribe to this provider's service in order to be able to utilize the WLAN connectivity. If, for example, a user moves about frequently, this could necessitate subscribing to numerous different providers for the appropriate hotspot accesses. It can become increasingly difficult for the user to manage and administer these various subscriptions if, for example, the user needs to connect from different cities or even different countries.

Packet-switched mobile networks, for example cellular mobile networks such as the General Packet Radio Service (GPRS) have been used conventionally to extend connectivity of a remote user to hosts on a fixed IP network (e.g., Internet). If the packet-switched mobile network utilizes IP as its transport mechanism, then packets from the remote user are transported within the IP datagrams of the mobile network's transport mechanism. However, mobile networks conventionally assign a private IP address to the host of the mobile (remote) user. Therefore, only unidirectional communications from a mobile host of the remote user to hosts on the fixed IP network are possible. For example, in conventional systems, a browser on a mobile terminal of the remote user can access a web-server on the fixed IP network. However, a browser running on a host of the fixed IP network cannot access a web-server on a host of the remote user.

It is desirable in view of the foregoing to provide for multi-user VPN connectivity with reduced implementational complexity in the hosts, to extend the range of wireless LANs, and to provide for LAN communications across packet-switched mobile networks.

Exemplary embodiments of the present invention use tunneling to exploit the address translation capabilities of packet-switched mobile networks in order to achieve bidirectional LAN communications therethrough. Exemplary embodiments according to the invention can also provide for a multi-user VPN by encapsulating a multi-user LAN communication protocol for traversal of a packet-switched network. Some embodiments encapsulate a commonly available multi-user LAN communication protocol, for example ethernet, thereby extending remote LAN connectivity without requiring any host reconfiguration.

BRIEF DESCRIPTION OF THE DRAWINGS

FIG. 2 diagrammatically illustrates exemplary embodiments of an address translator for translating addresses in tunnel headers according to the invention.

DETAILED DESCRIPTION

Figure 1:
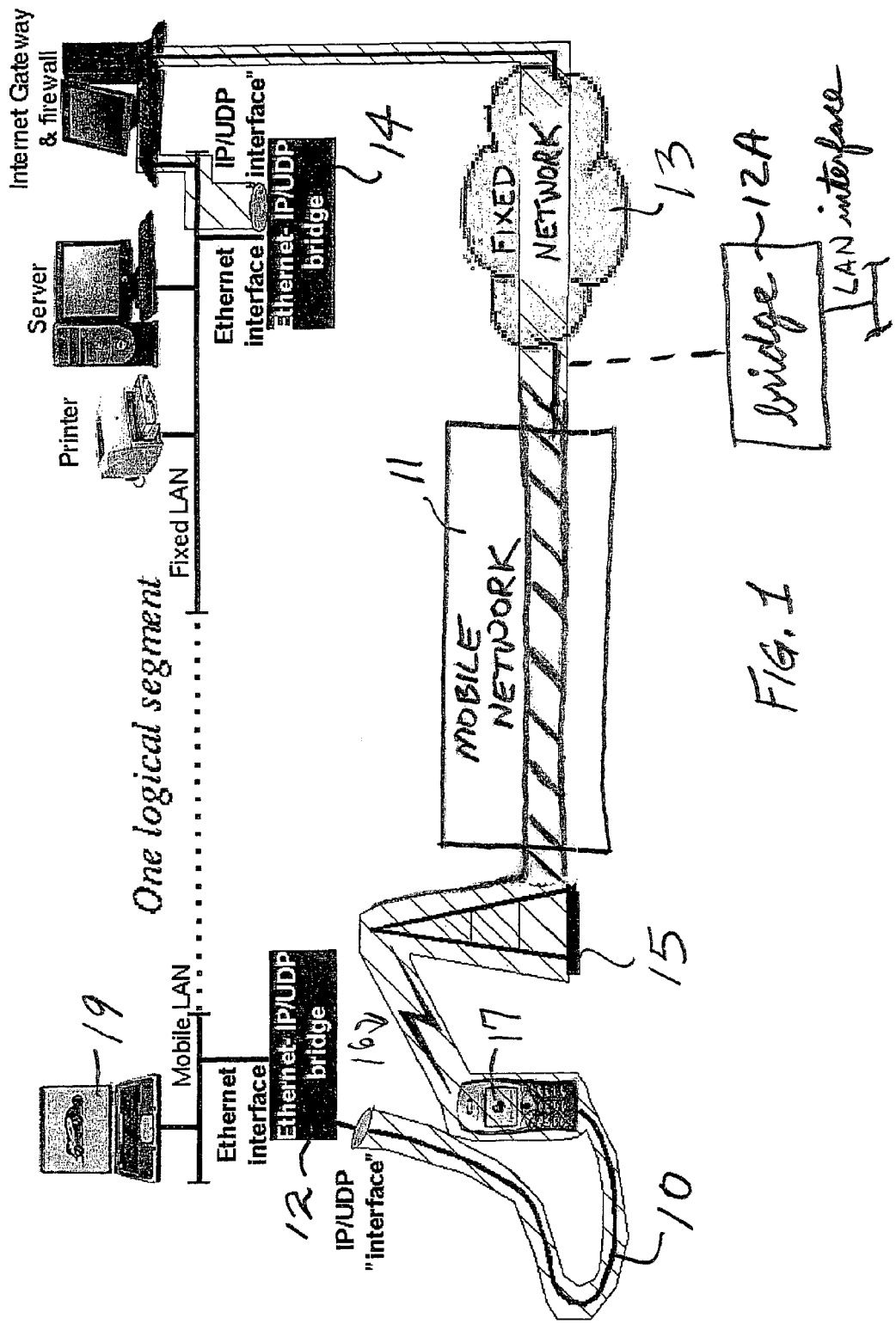
FIG. 1 diagrammatically illustrates a remote LAN connectivity architecture according to exemplary embodiments of the invention.

Exemplary embodiments of the present invention utilize packet-switched mobile networks to extend the coverage area of LANs, including exploiting the address translation characteristic prevalent in conventional packet-switched mobile networks to permit bidirectional LAN communications across packet-switched mobile networks.

As an example, the conventional GPRS network includes a network address translator (NAT) which resides at the boundary of the network, and can interface with a packet-switched fixed network, for example the Internet. When a UDP stream is initiated from a host on the GPRS network to a host on the fixed network, that stream passes through the NAT. The NAT maintains an association between the private IP address that was previously assigned (by GPRS) to the sending host, and the UDP port number which identifies the stream. The NAT replaces the mobile host's private IP address (in the source address field of the packet) with the NAT's own public IP address, and then sends the resulting packet on to its destination host on the fixed LAN/Internet.

When the destination host responds to the aforementioned UDP stream, that response will be addressed to the NAT's public IP address, because that was the source address of the traffic stream received by the host on the fixed LAN/Internet. Based on the UDP port number in the incoming response packet, the NAT uses its UDP port number-to-private IP address association to replace its own public IP address (in the destination field of the incoming packet) with the private IP address of the host on the mobile network, and then forwards the resulting packet to the host on the mobile network.

Therefore, once an IP/UDP stream has been transmitted from the host on the mobile network with the private IP address, the NAT of the GPRS network can, by virtue of its UDP port number-to-private IP address association capability, facilitate the effectuation of a responsive IP/UDP traffic stream from the host on the fixed LAN/Internet back to the originating host at the remote LAN segment on the mobile network.

Accordingly, exemplary embodiments of the present invention exploit the address translation capabilities of conventional mobile networks such as GPRS networks by encapsulating LAN frames or datagrams to create a tunnel (e.g., an IP/UDP tunnel) from the remote LAN segment through the packet-switched mobile network and the packet-switched fixed network to the fixed LAN segment. Thus, in the example of a GPRS network and an IP/UDP tunnel, the ability of the network address translator to associate the UDP streams to the IP addresses permits response traffic from the host on the fixed (home) LAN segment to be properly associated with the host on the mobile (remote) LAN segment to which the response traffic is directed. As a result, bidirectional communication between hosts on the remote LAN segment and the home LAN segment can be accomplished.

FIG. 1 diagrammatically illustrates exemplary embodiments of a remote LAN connectivity architecture according to the invention. As shown in FIG. 1, a pair of peer bridges 12 and 14 can be utilized to implement a tunnel, for example an IP/UDP tunnel. This tunnel is illustrated by the hatched signal path of FIG. 1. The tunnel extends from a remote (mobile) LAN segment to a home (fixed) LAN segment, thereby creating one logical LAN segment, so that a host on the home (fixed) LAN segment can communicate bidirectionally with a host on the geographically separated remote LAN segment as though both hosts were connected on the same physical LAN segment.

As shown in FIG. 1, the home and remote LAN segments can, in some embodiments, utilize ethernet protocol. In such embodiments, the bridges at 12 and 14 each have an ethernet interface and a "tunnel interface", for example an IP/UDP tunnel interface. For example, the bridge 12 can receive raw ethernet frames from the remote LAN segment and can encapsulate these raw ethernet frames by prepending thereto IP/UDP headers, thereby setting up an IP/UDP tunnel which transports tunnel packets. Each tunnel packet includes a tunnel (e.g., IP/UDP) header and a payload (e.g., a raw ethernet frame). Using the example of IP/UDP headers as tunnel headers, each tunnel header includes an IP source address field which carries the private IP address assigned to the bridge 12 by the mobile network 11, and an IP destination address field which carries the IP address of the destination bridge 14. The tunnel header produced by the bridge 12 will also include a UDP field which carries a UDP port number. The IP source address fields of each IP/UDP tunnel header produced by bridge 12 will be identical, as will the IP destination address fields. The UDP port numbers provided by bridge 12 in the UDP fields of the tunnel headers are respectively associated with the respective streams of raw ethernet frames from the respective ethernet users on the remote LAN segment. The bridge 12 assigns a unique UDP port number to each ethernet stream, and stores the associations between UDP port numbers and ethernet streams.

The bridge 12 can, in some embodiments, transmit the encapsulated raw ethernet frames as PPP/IP/UDP/raw ethernet packets. These packets can then traverse a serial communication link 10, a wireless communication device (for example a cellular telephone) 17, a wireless communication link 16, a base station 15, a packet-switched mobile network 11 (e.g., a GPRS network, a WCDMA network, an EDGE network, a CDMA 2000 network, etc.), and a packet-switched fixed network (for example the Internet) 13 in conventional fashion. The fixed network 13 can provide an Ethernet/IP/UDP/raw ethernet packet to an Internet gateway and firewall which can use conventional techniques to determine whether the packet should be admitted to the home LAN segment. Those Ethernet/IP/UDP/raw ethernet packets which successfully traverse the gateway/firewall are then provided to the IP/UDP "tunnel interface" of the bridge 14. The bridge 14 strips off the Ethernet/IP/UDP headers in order to place on the home LAN segment raw ethernet frames which are the original raw ethernet frames output by the mobile host (for example the laptop 19) on the remote LAN segment. The bridge 14 can use conventional techniques to store a unique association of each remotely-originated UDP port number with the respectively corresponding remotely-originated stream of ethernet frames.

Continuing with the example of ethernet hosts and IP/UDP tunneling, in communications from the home LAN segment to the remote LAN segment, the bridge 14 receives raw ethernet frames on the home LAN segment, and prepends thereto IP/UDP tunnel headers in order encapsulate the raw ethernet frames for transmission in tunnel packets to the remote LAN segment. Thus, when an ethernet host on the home LAN segment outputs a raw ethernet frame in response to ethernet traffic received from an ethernet host on the remote LAN segment, the bridge 14 can associate this raw ethernet frame with the proper UDP port number (which was originally assigned by bridge 12). Therefore, in the tunnel header that the bridge 14 prepends to a given raw ethernet frame, the UDP field will carry the UDP port number that has been assigned to the associated ethernet stream, the source address field will carry the IP address of the bridge 14, and the destination address field will carry the IP address of the address translator within the packet-switched mobile network 11. As described above, for the example of a given ethernet communication session between remote users on the respective LANs, both bridges will maintain, throughout the session, the UDP port number originally assigned by bridge 12 to the first-received ethernet frame of the session.

As mentioned above, the address translator of the packet-switched mobile network 11 can associate the UDP port number of the tunnel header produced by the bridge 14 with the private address of the bridge 12 that originally assigned the UDP port number. The address translator replaces the destination address (i.e., its own address) in the tunnel header with the private IP address of the bridge 12. The resulting tunnel packet with the tunnel header thusly modified is then sent out over the mobile network 11 to the bridge 12. Upon receiving a packet from the serial connection 10, the bridge 12 strips the PPP/IP/UDP header, and then outputs the remaining raw ethernet frame onto the remote LAN segment.

FIG. 2 diagrammatically illustrates pertinent portions of exemplary embodiments of an address translator used in a packet-switched mobile network according to the invention. In FIG. 2 and hereinbelow, "uplink" refers to tunnel packets and tunnel headers traveling from bridge 12 toward bridge 14

(see also FIG. 1), and "downlink" refers to tunnel packets and tunnel headers traveling from bridge 14 toward bridge 12. As shown in FIG. 2, the address translator includes address association logic 21 having a public address storage portion 23, a store logic portion 25 and a retrieve logic portion 27. When the mobile network 11 receives an uplink packet, the store logic portion of the address associator logic 21 associates the stream identifier (ID) information (for example the UDP port number) in the uplink tunnel header with the private source address of the bridge 12 (for example a private IP address), which is also in the uplink tunnel header. The address translator modifies the source address field of the uplink tunnel header to replace the private source address of the bridge 12 with the address translator's own public address from storage 23. After the address translator's public address has been inserted into the source address field of an uplink tunnel header, the entire tunnel packet, thusly modified, is forwarded to the bridge 14.

When the packet-switched mobile network 11 receives a downlink packet, the address translator applies the stream identifier from the downlink tunnel header to the retrieve logic portion 27. In response to the stream identifier, the retrieve logic portion retrieves the private source address of the bridge 12, this private source address having been previously associated with the stream identifier by the store logic portion 25 in response to an uplink tunnel header previously received from the bridge 12. The address translator modifies the destination address field of the downlink tunnel header to replace the destination address with the private source address retrieved from the retrieve logic portion 27. With the private source address of the bridge 12 now provided as the destination address in the downlink tunnel header, the entire downlink packet, thusly modified, is forwarded to the bridge 12.

Referring generally to the bridges 12 and 14, the functionality of these bridges is generally similar to that of conventional bridges in that these bridges forward packets between two interfaces. However, the bridges 14 actually bridge between a physical layer-2 (e.g., ethernet) interface and a logical layer-3 (e.g., IP/UDP) "interface". Ethernet frames observed on the physical ethernet interface are forwarded out to the IP/UDP "tunnel interface". Thus, a raw ethernet frame on the ethernet interface is encapsulated within the IP/UDP packet and sent out on the "tunnel interface". The "tunnel interface" is also referred to herein as a "logical interface" because IP/UDP are not layer-2 protocols.

The bridges 12 and 14 also have different physical link configurations. The bridge 12 has two physical interfaces, one ethernet interface, and one serial interface 10 connected to the wireless mobile communication device 17. The bridge 14 has only one physical interface, namely the ethernet interface.

In some exemplary embodiments, the bridges 12 and 14 can be separate physical entities connected to their associated LAN segments. The bridges 12 and 14 could be provided by personal computers or other specifically designed boxes connected to the associated LAN segment just as the other hosts are connected to those LAN segments. In some embodiments, the bridge 12 can be a mobile phone accessory which has an ethernet interface and which is further adapted to be connected to a mobile phone such as illustrated generally at 17.

In some embodiments, the bridge 14 can be implemented as a software program running on the Internet gateway/firewall. In some embodiments, the bridge 12 can be implemented as a software program running on a mobile PDA/phone type of device.

With respect to IP/UDP embodiments, the foregoing description demonstrates that the bridges 12 and 14 can be provided on any device, typically a computer device, which implements an IP stack. Various open-source implementations of tunneling protocols are conventionally available on the Internet, and bridging functionality is conventionally available on various open-source operating systems. Thus, in IP/UDP embodiments, the bridges 12 and 14 can be produced, for example, by combining conventionally available bridging functionality with conventionally available tunneling protocol implementations to produce bridges with logical IP/UDP interfaces.

In embodiments such as illustrated in FIG. 1, a multi-user VPN is created by the combination of a multi-user/multi-host protocol such as ethernet with a tunnelizing encapsulation technique. More specifically, using the tunnel created by the bridges 12 and 14, any or all of a first plurality of users/hosts on the remote LAN segment can communicate bidirectionally with any or all of a second plurality of users/hosts on the home LAN segment. Moreover, due to the wide use of ethernet technology (e.g., virtually every PC sold today includes an ethernet card), the LAN architecture of the present invention is accessible to virtually any type of data communication device with basically no requirement of reconfiguring any part of the device or loading any type of specialized software.

As illustrated by dashed line in FIG. 1, other exemplary VPN architectures according to the invention can provide a bridge 12A for communication with the bridge 14 across one or more packet-switched fixed networks, but without any wireless network involved, thereby permitting realization of a fixed network, multi-user/multi-host VPN. In such embodiments, if the LAN interface is an ethernet interface, then the fixed network, multi-user/multi-host VPN can be realized with little or no configuration issues with respect to the ethernet hosts associated with the bridges 12A and 14. The bridge 12A can, in some embodiments, operate the same as its peer bridge 14.

Because the above-described tunnel techniques involve traversing public networks, some embodiments can provide security for transporting the LAN frames back and forth between the remote and home LAN segments. For example, in some embodiments, the bridges 12 and 14 can work as "matched pairs", and share common keys. During the tunnel creation phase, a conventional challenge-response mechanism can be used to authenticate the peer bridge. Upon success, a unique session key can then be generated each time the tunnel is set up, to be used to encrypt the LAN (e.g., ethernet) frames within the tunnel, thereby providing a secure tunnel.

As described above, exemplary embodiments of the invention provide connectivity on the datalink-layer (e.g., ethernet-layer). This creates for hosts on the home and remote LAN segments the perception of a single physical LAN (for example an ethernet LAN), while in reality the architecture can span vast geographical distances to interconnect two physically separate LAN segments into one logical LAN segment. Because packet switched mobile networks, such as cellular mobile networks, typically have nationwide coverage and worldwide connectivity, the LAN architecture according to the invention can bridge LAN frames between two LAN segments which are literally halfway around the globe from one another.

As the foregoing description makes clear, exemplary embodiments of the remote LAN connectivity architecture according to the invention provide numerous advantages, many of which are described above, and more examples of which follow.

Hosts on the LAN segments can generate their normal LAN frames (for example ethernet frames) as they normally would. Thus, in ethernet embodiments, the LAN architecture accommodates all DHCP, DNS, ARP, legacy applications, etc.

The architecture provides layer-3 independence. The LAN segments can run e.g., IPv4, IPv6, IPX, EtherTalk, OSI, etc. In the ethernet example, these layer-3 datagrams will be encapsulated in ethernet, which is then encapsulated for tunnel transport to the other LAN segment, regardless of the network (layer-3) protocol.

The architecture provides all of the advantages of packet-switching as compared to circuit-switching. In the IP network example, charging and resource utilization can be exploited because the tunnel extends over a packet-switched IP network (or networks).

Also, according to exemplary embodiments of the invention, the layer-3 protocols utilized by hosts on the LAN segments need not match the layer-3 protocol used by the packet-switched network between the LAN segments. For example, if a host on one of the LAN segments uses IPv6 at layer-3, and assuming for example that the packet-switched fixed network is the Internet, then IPv6-over-ethernet frames would be transported end-to-end over the Internet, within the Internet's IPv4/UDP tunnel.

Although exemplary embodiments of the invention are described above in detail, this does not limit the scope of the invention, which can be practiced in a variety of embodiments.

What is claimed is:

1. A method of packet-switched communications, the method comprising:
   interconnecting two physically separate Local Area Network (LAN) segments, a remote LAN segment and a fixed LAN segment, into one logical LAN segment; and
   providing connectivity on a datalink-layer by encapsulating LAN frames or datagrams to create a tunnel from the remote LAN segment through a packet-switched mobile network and a packet-switched fixed network to the fixed LAN segment;
   wherein said tunnel is connected to the remote LAN segment via a first bridge, and wherein said tunnel is connected to the fixed LAN segment via a second bridge, such that the tunnel extends from the remote LAN segment to the fixed LAN segment, thereby creating said one logical LAN segment;
   wherein said first and second bridges each provide an interface between a physical layer-2 interface of the LAN segments and a logical layer-3 interface of the tunnel;
   wherein the remote LAN segment is geographically separate from the fixed LAN segment; and
   wherein a host on the fixed LAN segment can communicate bidirectionally with a host on the geographically separate remote LAN segment as though both hosts were connected on the same physical LAN segment.

2. The method of claim 1, wherein said tunnel is an Internet Protocol/User Datagram Protocol (IP/UDP) tunnel.

3. The method of claim 2, wherein said LAN frames or datagrams are Ethernet frames, and said Ethernet frames are encapsulated through said IP/UDP tunnel.

4. The method of claim 1, wherein a multi-user Virtual Private Network (VPN) is created by a combination of a multi-user/multi-host protocol with a tunnelizing encapsulating technique.

5. The method of claim 4, wherein any or all of a first plurality of users/hosts on the remote LAN segment can communicate bidirectionally with any or all of a second plurality of users/hosts on the fixed LAN segment by using said tunnel.

6. The method of claim 1, wherein said packet-switched mobile network includes a network address translator associating User Datagram Protocol (UDP) streams to IP addresses to permit response traffic from a host on the fixed LAN segment to be properly associated with a host on the remote LAN segment to which the response traffic is directed.

7. The method of claim 1, wherein said physical layer-2 interface is an Ethernet interface and said logical interface is an Internet Protocol/User Datagram Protocol (IP/UDP) interface, effectively providing an Ethernet-IP/UDP bridge.

8. An apparatus for packet-switched communications, the apparatus comprising:
   processing circuitry configured to interconnect two physically separate Local Area Network (LAN) segments, a remote LAN segment and a fixed LAN segment, into one logical LAN segment;
   the processing circuitry further configured to provide connectivity on a datalink-layer by encapsulating LAN frames or datagrams to create a tunnel from the remote LAN segment through a packet-switched mobile network and a packet-switched fixed network to the fixed LAN segment;
   the processing circuitry further configured to provide connectivity on the datalink-layer by implementing a tunnel that extends from the remote LAN segment to the fixed LAN segment, thereby creating said logical LAN segment, so that a host on the fixed LAN segment can communicate bidirectionally with a host on the remote LAN segment, which is geographically separate, as though both hosts were connected on the same physical LAN segment;
   wherein said tunnel is connected to the remote LAN segment via a first bridge, and wherein said tunnel is connected to the fixed LAN segment via a second bridge, such that the tunnel extends from the remote LAN segment to the fixed LAN segment, thereby creating said one logical LAN segment;
   wherein said first and second bridges each provide an interface between a physical layer-2 interface of the LAN segments and a logical layer-3 interface of the tunnel.

9. The apparatus of claim 8, wherein said tunnel is an Internet Protocol/User Datagram Protocol (IP/UDP) tunnel.

10. The apparatus of claim 9, wherein said LAN frames or datagrams are Ethernet frames, and said Ethernet frames are encapsulated through said IP/UDP tunnel.

11. The apparatus of claim 8, wherein said apparatus is configured for combining a multi-user/multi-host protocol with a tunnelizing encapsulating technique to create a multi-user Virtual Private Network (VPN).

12. The apparatus of claim 11, wherein said apparatus is configured for using said tunnel to enable any or all of a first plurality of users/hosts on the remote LAN segment to communicate bidirectionally with any or all of a second plurality of users/hosts on the fixed LAN segment.

13. The apparatus of claim 8, wherein said packet-switched mobile network includes a network address translator configured for associating User Datagram Protocol (UDP) streams to Internet Protocol (IP) addresses to permit response traffic from a host on the fixed LAN segment to be properly associated with a host on the remote LAN segment to which the response traffic is directed.

14. The apparatus of claim 8, wherein said physical layer-2 interface is an Ethernet interface and said logical interface is an IP/UDP interface, effectively providing an Ethernet-IP/UDP bridge.

15. A first bridge for operation with an associated Local Area Network (LAN) segment, the bridge comprising:
- an interface configured for receiving LAN frames or datagrams from the associated LAN segment;
- processing circuitry configured for encapsulating the LAN frames or datagrams to produce corresponding encapsulated LAN frames or datagrams; and
- a tunnel interface configured for outputting said encapsulated LAN frames or datagrams onto a tunnel to another physically separate LAN segment through a packet-switched mobile network and a packet-switched fixed network, wherein said tunnel is connected to the physically separate LAN segment via a second bridge;
- wherein said first and second bridges each provide an interface between a physical layer-2 interface of the LAN segments and a logical layer-3 interface of the tunnel;
- wherein the associated LAN segment is geographically separate from the physically separate LAN segment; and
- wherein a host on the associated LAN segment can communicate bidirectionally with a host on the physically separate remote LAN segment as though both hosts were connected on the same physical LAN segment.

16. The first bridge of claim 15, wherein said interface for receiving LAN frames is an Ethernet interface for receiving Ethernet frames, and said processing circuitry is configured for encapsulating the Ethernet frames for transmission in tunnel packets by prepending thereto Internet Protocol/User Datagram Protocol (IP/UDP) headers, to thereby set up an IP/UDP tunnel which transports the tunnel packets.

17. The first bridge of claim 16, wherein said bridge is configured for:
- assigning a unique UDP port number to each Ethernet stream; and
- storing associations between UDP port numbers and Ethernet streams.

18. The first bridge of claim 15 wherein said associated LAN segment is one of a remote LAN segment and a fixed LAN segment, and wherein said physically separate LAN segment is the other of the remote LAN segment and the fixed LAN segment.

19. A second bridge for operation with an associated Local Area Network (LAN) segment, the bridge comprising:
- a tunnel interface configured for receiving encapsulated LAN frames or datagrams from another physically separate LAN segment, via a tunnel through a packet-switched mobile network and a packet-switched fixed network, wherein said tunnel is connected to the physically separate LAN segment via a first bridge;
- processing circuitry configured for de-encapsulating the received encapsulated LAN frames to obtain corresponding LAN frames or datagrams; and
- an interface configured for outputting said LAN frames or datagrams to the associated LAN segment;
- wherein said first and second bridges each provide an interface between a physical layer-2 interface of the LAN segments and a logical layer-3 interface of the tunnel;
- wherein the associated LAN segment is geographically separate from the physically separate LAN segment; and
- wherein a host on the associated LAN segment can communicate bidirectionally with a host on the physically separate remote LAN segment as though both hosts were connected on the same physical LAN segment.

20. The second bridge of claim 19, wherein said tunnel interface for receiving encapsulated LAN frames or datagrams is an IP/UDP tunnel interface, and
- wherein said processing circuitry is configured for stripping off headers of the encapsulated LAN frames in order to place raw Ethernet frames on an Ethernet interface to the associated LAN segment.

21. The second bridge of claim 19, wherein said associated LAN segment is one of a remote LAN segment and a fixed LAN segment, and
- wherein said physically separate LAN segment is the other of the remote LAN segment and the fixed LAN segment.

* * * * *

UNITED STATES PATENT AND TRADEMARK OFFICE
CERTIFICATE OF CORRECTION

| | | |
|---|---|---|
| PATENT NO. | : 9,160,714 B2 | Page 1 of 1 |
| APPLICATION NO. | : 10/610376 | |
| DATED | : October 13, 2015 | |
| INVENTOR(S) | : Westberg et al. | |

It is certified that error appears in the above-identified patent and that said Letters Patent is hereby corrected as shown below:

Specification

In Column 2, under Line 23, insert Heading -- BRIEF SUMMARY OF THE INVENTION --.

Signed and Sealed this
Eighth Day of March, 2016

Michelle K. Lee
*Director of the United States Patent and Trademark Office*